United States Patent
Ukraintsev et al.

(10) Patent No.: US 12,253,539 B2
(45) Date of Patent: *Mar. 18, 2025

(54) METHOD OF EXAMINING A SAMPLE IN AN ATOMIC FORCE MICROSCOPE USING ATTRACTIVE TIP-TO-SAMPLE INTERACTION

(71) Applicant: CESKE VYSOKE UCENI TECHNICKE V PRAZE, Prague (CZ)

(72) Inventors: Egor Ukraintsev, Kladno (CZ); Bohuslav Rezek, Prague (CZ)

(73) Assignee: CESKE VYSOKE UCENI TECHNICKE V PRAZE, Prague (CZ)

( * ) Notice: Subject to any disclaimer, the term of this patent is extended or adjusted under 35 U.S.C. 154(b) by 0 days.

This patent is subject to a terminal disclaimer.

(21) Appl. No.: 18/010,533

(22) PCT Filed: Jul. 13, 2021

(86) PCT No.: PCT/CZ2021/050076
§ 371 (c)(1),
(2) Date: Dec. 15, 2022

(87) PCT Pub. No.: WO2022/258084
PCT Pub. Date: Dec. 15, 2022

(65) Prior Publication Data
US 2024/0264199 A1    Aug. 8, 2024

(51) Int. Cl.
*G01Q 10/06* (2010.01)
(52) U.S. Cl.
CPC ................ *G01Q 10/065* (2013.01)

(58) Field of Classification Search
CPC ....... G01Q 10/065; G01Q 60/04; G01Q 60/10
See application file for complete search history.

(56) References Cited

U.S. PATENT DOCUMENTS

| 4,343,993 A | 8/1982 | Binnig et al. |
| 4,724,318 A | 2/1988 | Binnig |
| (Continued) | | |

FOREIGN PATENT DOCUMENTS

| CN | 104865409 A | 8/2015 |
| CZ | 307100 B6 | 1/2018 |
| (Continued) | | |

OTHER PUBLICATIONS

International Search Report (Apr. 4, 2022) for corresponding Int. App. PCT/CZ2021/050076.

*Primary Examiner* — Nicole M Ippolito
(74) *Attorney, Agent, or Firm* — WRB-IP PLLC (57) ABSTRACT

A method of examining a sample in an atomic force microscope including at least one probe, each probe including at least one cantilever and at least one tip includes carrying out a negative setpoint setting procedure, wherein the negative setpoint $S_{CD}$ is set as a negative real number, an approaching procedure including: above at least one point of the sample, performing an approach including reducing the tip-to-sample distance and recording cantilever deflection as a function of the tip-to-sample distance, while applying the standard sign convention with cantilever deflection considered negative for attractive forces and positive for repulsive forces, until at least one of critical criteria is achieved, and pausing or stopping of the approach after performing the approaching procedures.

15 Claims, 9 Drawing Sheets

(56) References Cited

U.S. PATENT DOCUMENTS

| | | |
|---|---|---|
| 5,266,801 A | 11/1993 | Elings et al. |
| 5,412,980 A | 5/1995 | Elings et al. |
| 6,189,374 B1 | 2/2001 | Adderton et al. |
| 6,389,885 B1 | 5/2002 | Arnold et al. |
| 6,545,263 B2 | 4/2003 | Lange et al. |
| 7,051,582 B2 | 5/2006 | Akiyama |
| 7,509,844 B2 | 3/2009 | Wang et al. |
| 7,603,891 B2 | 10/2009 | Proksch |
| 7,963,153 B2 | 6/2011 | Wang et al. |
| 7,975,315 B2 | 7/2011 | Ando et al. |
| 8,443,461 B2 | 5/2013 | Ohnesorge |
| 8,646,109 B2 | 2/2014 | Hu et al. |
| 8,881,311 B2 | 11/2014 | Raschke et al. |
| 9,575,090 B2 | 2/2017 | Liu et al. |
| 9,891,418 B2 | 2/2018 | Spizig et al. |
| 10,197,595 B2 | 2/2019 | Su |
| 10,444,258 B2 | 10/2019 | Proksch et al. |
| 10,502,761 B2 | 12/2019 | Hu et al. |
| 10,557,865 B2 | 2/2020 | Proksch et al. |
| 10,895,584 B2 | 1/2021 | Pacheco |
| 2005/0029450 A1 | 2/2005 | Hough et al. |
| 2017/0261532 A1 | 9/2017 | Pieper et al. |
| 2021/0011053 A1 | 1/2021 | Dazzi et al. |
| 2024/0264198 A1* | 8/2024 | Rezek ............... G01Q 60/10 |

FOREIGN PATENT DOCUMENTS

| | | |
|---|---|---|
| EP | 3226009 A1 | 10/2017 |
| JP | 4721973 B2 | 7/2011 |
| WO | 2013192617 A1 | 12/2013 |
| WO | 2020097302 A1 | 5/2020 |

* cited by examiner

Fig. 1a (State of Art)

Fig. 1b (State of Art)

METHOD OF EXAMINING A SAMPLE IN AN ATOMIC FORCE MICROSCOPE USING ATTRACTIVE TIP-TO-SAMPLE INTERACTION

BACKGROUND AND SUMMARY

This invention relates to a non-contact atomic force microscopy (AFM) method which considers attractive interaction between the tip and the sample to stop the approach between the tip and the sample before the contact between them and thus to reduce the amount of the tip-to-sample contacts and the tip-to-sample interaction forces.

Since the invention of STM (U.S. Pat. No. 4,343,993) and AFM (U.S. Pat. No. 4,724,318) three AFM modes are used the most often. Mode A is a conventional contact non-resonant mode. Mode B is a conventional contact resonant mode. Mode C is a conventional non-contact resonant mode.

Figure 1A:
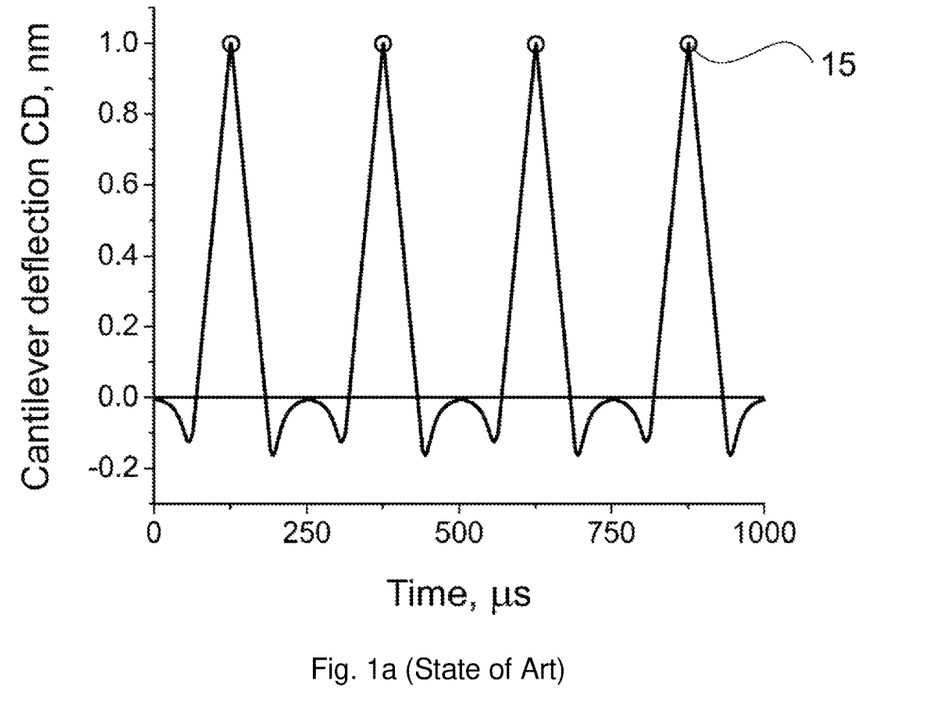
FIG. 1a and FIG. 1b illustrate the dependency of cantilever deflection on time for the three most common AFM state-of-art methods: the contact non-resonant mode A is in FIG. 1a and for the resonant modes in both contact B and non-contact C versions is in FIG. 1b.

In addition to a conventional scanning at a constant tip-to-sample contact force, advanced examples of mode A are: Jumping probe from Digital Instruments (U.S. Pat. No. 5,266,801), Peak Force QNM™ from Bruker (U.S. Pat. No. 8,646,109), Jumping Mode™ from NT-MDT (U.S. Pat. No. 9,110,092B1), Digital Pulsed Force Mode™ from WITec (U.S. Pat. No. 9,891,418B2), Quantitative Imaging™ from JPK (https://www.jpk.com/news/2011/jpk-launches-qi-quantitative-imaging-mode-for-the-most-challenging-ofafm-samples), Fast Force Mapping Mode™ from Oxford Instruments (https://afm.oxinst.com/products/cypher-nano-mechanical-accessories/cypher-fast-force-mapping-mode) etc. In those advanced modes, AFM always operates in repulsive mode with clear contact between the tip and the sample during the force-distance dependence measurement at a frequency much below the cantilever's resonant frequency, as shown in the FIG. 1a. FIG. 1a shows the cantilever deflection as a function of time for mode A, i.e. for conventional contact non-resonant AFM described in the preceding references. Hereinafter, CD will be used as symbol and/or acronym for cantilever deflection. The detailed definition of this term and of some others used in this section is given below in the Description of Embodiments section.

In the mode A, the measured topographical information can be called the surface of the constant positive cantilever deflection CD, and with some proviso it is the surface of constant repulsive force. There are several improvements of this mode: patent CN104991089B, which allows faster measurements by overcoming the necessity to wait for the cantilever "ringing notification" before retraction; U.S. Ser. No. 10/895,584B2 and KR101655051B1, which allow simultaneous measurements of mechanical and electrical properties by performing one or several approach-retraction cycles in each point; U.S. Pat. No. 9,575,090B2, which describes how to perform force measurements with real-time baseline determination; patent application WO2020097302A1, which describes the analysis of "ringing signal" to obtain 8 new channels.

Examples of the mode B are: Tapping Mode™ from Digital Instruments (U.S. Pat. No. 5,412,980), AM-FM mode from Oxford Instruments, Asylum Research Inc. (U.S. Ser. No. 10/557,865B2). Examples of the mode C are: non-contact AFM (JP4721973B2), True Non-Contact™ Mode from Park, non-destructive ambient dynamic mode AFM (U.S. Pat. No. 7,963,153B2), tuning fork probe-based dual-frequency AFM (CN104865409B), AFM with self-excitedly oscillated cantilever (U.S. Pat. No. 7,975,315B2), AFM with Akiyama-probe, an actuating and sensing device (U.S. Pat. No. 7,051,582B2). In those modes AFM always operates at a cantilever's resonance frequency in contact or non-contact regime. As feedback signal they use: the cantilever oscillation amplitude and/or phase between cantilever oscillations and driving signal or frequency shift at resonance frequency or quite close to the resonant frequency, as shown in the FIG. 1b. Due to the requirement to perform measurements at the resonant frequency, very soft cantilevers cannot be used. Moreover, the possibility to perform measurements in liquids using soft cantilevers is very limited in those modes.

In the mode C, the measured topographical information can be called the surface of attractive force with constant cantilever oscillation amplitude/phase/frequency shift. There are several improvements of this mode: U.S. Pat. No. 7,509,844B2 that minimizes the tip-to-sample interaction by considering the phase signal, which start to change faster when the tip is approaching the sample; U.S. Pat. No. 7,603,891B2 and U.S. Ser. No. 10/444,258B2 that utilize cantilever oscillations on multiple frequencies to reduce the tip-to-sample interaction; U.S. Pat. No. 6,189,374B1 that uses active (self-actuated) probe to optimize the quality factor of cantilever; U.S. Ser. No. 10/197,595B2 that uses dual-probes operated individually.

Figure 1B:
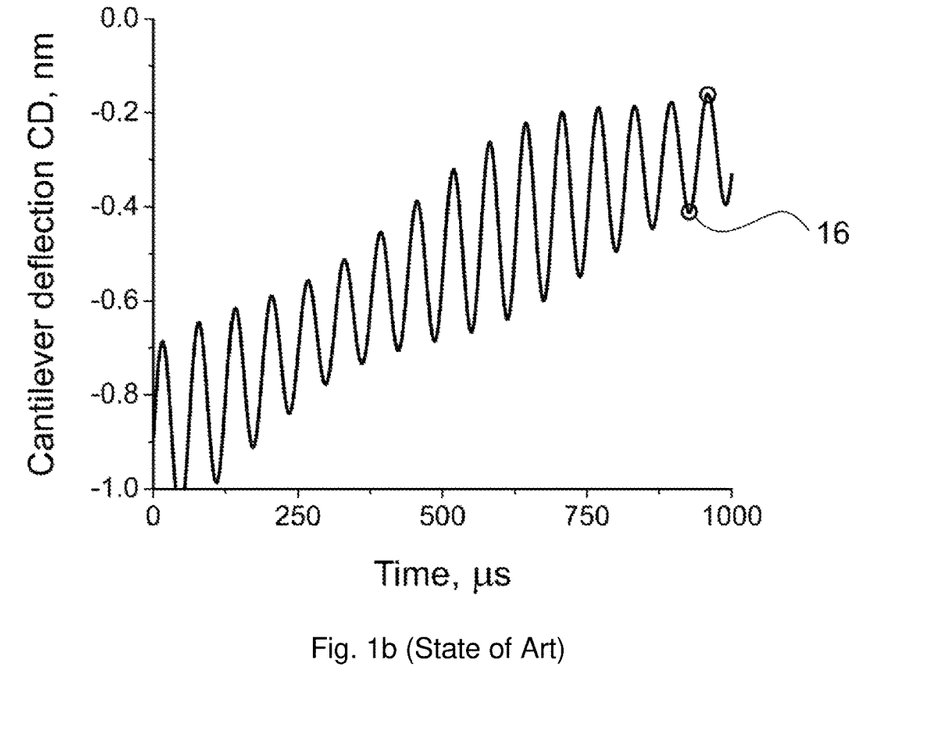

FIGS. 1a and 1b show the comparison between the conventional contact non-resonant AFM mode A and the conventional resonant AFM modes B and C. In all cases the cantilever deflection is measured during vertical movement of the tip above different points on the sample and during corresponding changes in the tip-to-sample distance D. FIG. 1a shows that the signal for the feedback loop corresponds to the positive cantilever deflection values, which are marked with first circles 15. FIG. 1b shows that the signal for the feedback loop is the oscillation amplitude value, which is marked with second circles 16.

There are also some patent documents, in which the AFM probe is located far from the sample (i.e. non-contact mode) and the cantilever is not oscillating at the cantilever resonance frequency (i.e. non-resonant mode). For example, U.S. Pat. No. 8,443,461B2 utilizes the long-range forces in liquids and the drift of the tip to obtain interatomic force measurements and quantify chemical bond forces between electronic orbitals by direct force measurements at sub-atomic lateral resolution. There are also some patents that utilize close proximity of the tip and the sample for optical or electrical measurements. U.S. Pat. No. 6,389,885B1 describes the imaging of the internal regions of a sample body using ultrasonic microscope. Patent application US2021011053A1 describes AFM based infrared spectroscopy (AFM-IR). U.S. Pat. No. 8,881,311B2 introduces method and apparatus of physical property measurement using a probe-based nano-localized light source (TERS). U.S. Pat. No. 6,545,263B2 shows scanning probe microscope with probe integrated in an optical system (SNOM). Patent CZ307100B6 describes a method of characterizing a sample surface by Scanning Electron Microscope (SEM) and Scanning Probe Microscope (SPM) simultaneously. Patent CN107228957B describes how STM probe can be used as an AFM sensor. However, none of these non-contact non-resonant methods discloses the subject matter of the present invention as specified in the attached claims, namely the use of several specific critical criteria based on negative setpoint to stop the tip-to-sample approach and thus to reliably control the tip-to-sample approach and interaction in attractive force regime without using cantilever resonant frequency and thereby operate AFM without various limitations and drawbacks of the above mentioned methods.

Some AFMs (Nterga from NT-MDT, Dimension ICON from Bruker, Nanowizard from JPK etc.) allow user to measure in contact non-resonant AFM mode with positive setpoint, to record all force curves and use them to create a height image based on the tip position in different part of the force curve, not only in the point of strongest contact. However, those measurements remain contact measurements, i.e. they are invasive measurements and can induce sample or tip damage.

None of the conventional AFMs uses changes in CD caused by the attractive forces between the tip and the sample as a feedback signal. The use of attractive forces has been so far deemed unstable and unreliable for the CD feedback. The repulsive forces are used instead, with the drawbacks mentioned above.

At the moment there is no solution that allows non-contact AFM measurements performed with precise control of the tip-sample interactions and applicable for all types of cantilevers for measurements in air and in liquids with very reduced amount of the tip-to-sample contacts and reduced tip-to-sample interaction forces. Those types of measurements are required for instance to study highly mobile objects on surfaces down to atomic resolution.

The present invention is based, according to an aspect thereof, on 1) the usage of changes in CD due to the attractive forces, i.e. due to attractive interaction between the tip and the sample as a feedback signal for four critical criteria of approaching procedure, as opposed to the usage of repulsive forces in the state-of-art methods, and on 2) the setting of a threshold value, which will be called setpoint and noted $S_{CD}$ in this document, used to control at which value of cantilever deflection CD the tip approach to the sample must be stopped. This threshold value is set negative. Therefore, the variable $S_{CD}$ will be called "negative setpoint". The measured topographical information is the surface of constant negative cantilever deflection, with some proviso it is the surface of constant attractive interaction. The method according to the present invention works in the way that the tip and the sample practically never touch each other. The goal of an aspect of this invention is to measure the sample non-invasively, i.e. without the sample and the tip unwanted modifications. This new method is superior to all other known methods for measurements of highly mobile objects, which in the so far state-of-the-art methods can be moved by the tip even in the regime with minimal tip-to-sample interactions to the extent that they are invisible to the AFM.

A method of examining a sample is carried out in an atomic force microscope including at least one probe, each probe including at least one cantilever and at least one tip. The method comprises the following sequence of procedures:

negative setpoint $S_{CD}$ setting procedure, wherein the negative setpoint $S_{CD}$ is set as a negative real number;

approaching procedure comprising: above at least one point of the sample, performing an approach comprising reducing the tip-to-sample distance D and recording cantilever deflection CD as a function of the tip-to-sample distance D, while applying the standard sign convention with cantilever deflection CD considered negative for attractive forces and positive for repulsive forces, until at least one of critical criteria is achieved, the critical criteria consisting of or comprising:

first critical criterium: the cantilever deflection CD reaches the value substantially equal to the negative setpoint $S_{CD}$, i.e. CD≅$S_{CD}$;

second critical criterium: the cantilever deflection CD reaches the value substantially equal to the negative setpoint $S_{CD}$ divided by two and then the derivative of cantilever deflection in time reaches the value substantially equal to zero, i.e. CD≅$S_{CD}$≅2 is reached and then $$\frac{\partial CD}{\partial t} \cong 0$$

is reached;

third critical criterium: the cantilever deflection CD reaches the value substantially equal to the negative setpoint $S_{CD}$ divided by two and then the cantilever deflection CD reaches the value substantially equal to zero, i.e. CD≅$S_{CD}$/2 is reached and then CD≅0 is reached;

fourth critical criterium: the cantilever deflection CD reaches the value substantially equal to minus negative setpoint $S_{CD}$, i.e. CD≅−$S_{CD}$, after what the approach is paused or stopped.

An advantageous negative setpoint $S_{CD}$ setting procedure is disclosed, along with the use of the critical criteria based on the negative setpoint $S_{CD}$ during repeated approaches and retractions between the tip and the sample. Use of the invention in a scanning mode is disclosed as well, including non-resonant mode in one preferred embodiment.

Non-contact non-resonant AFM mode allows non-contact measurements performed with precise control of the tip-to-sample interactions and applicable for all type of cantilevers for measurements in ultra-high vacuum (UHV), in air and in liquids with very limited amount of the tip-to-sample contacts.

DETAILED DESCRIPTION

Figure 2A:
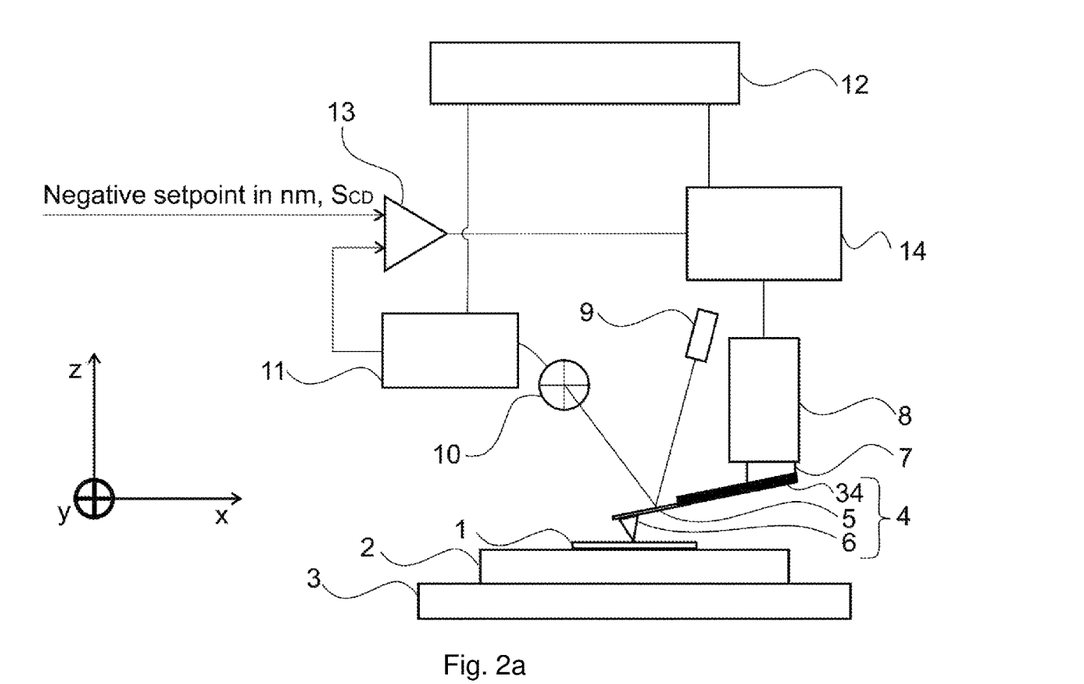
FIG. 2a illustrates the AFM functional scheme.

The method according to the present invention can be realized on any conventional atomic force microscopy hardware, as the one shown in the FIG. 2a. The sample 1 is placed on a sample stage 2 attached to a stage actuator 3 of XYZ or XY type, wherein XYZ are conventional cartesian coordinates. Each probe 4 usually consists from or comprises a chip 34, one or more flexible cantilever 5 and a probe 6 on the end of each cantilever 5. The probe 4 is placed into a probe holder 7, which is attached to a probe actuator 8 of XYZ or XY type. The laser 9 emits light, which reflects from the cantilever 5. The laser signal detected by a photodiode 10 is analyzed by a signal processing module 11, and by a computer 12. The commands, required to move the sample stage 2 and/or the probe 4, are send by controller 13 to a voltage amplifier 14 and to the corresponding actuators 3 and 8.

Definitions

Acronym AFM is used for both Atomic Force Microscopy and Atomic Force Microscope. An example of an AFM in which the present invention can be carried out is shown in FIG. 2a.

A relative movement of the tip 6 and of the sample 1 can be carried out by either moving the stage 2 with the sample 1, by moving the probe 4 and thus the tip 6, or by moving both, i.e. the stage 2 with the sample 1 and the probe 4 with its tip 6. It is commonplace to change the distance between the tip 6 and the sample 1 by moving the probe 4. As this is the most current scenario, the wordings as "probe approach" and "tip approach" will be used hereinafter to describe more briefly "reduction of the tip-to-sample distance D". Similarly, "probe retraction" and "tip retraction" should be understood also as "extension of the tip-to-sample distance D". As for the movements in the horizontal plane, the most current embodiment is that the probe 4 stays fixed in the horizontal plane and it is only the stage 2 that moves in the horizontal plane.

Figure 2B:
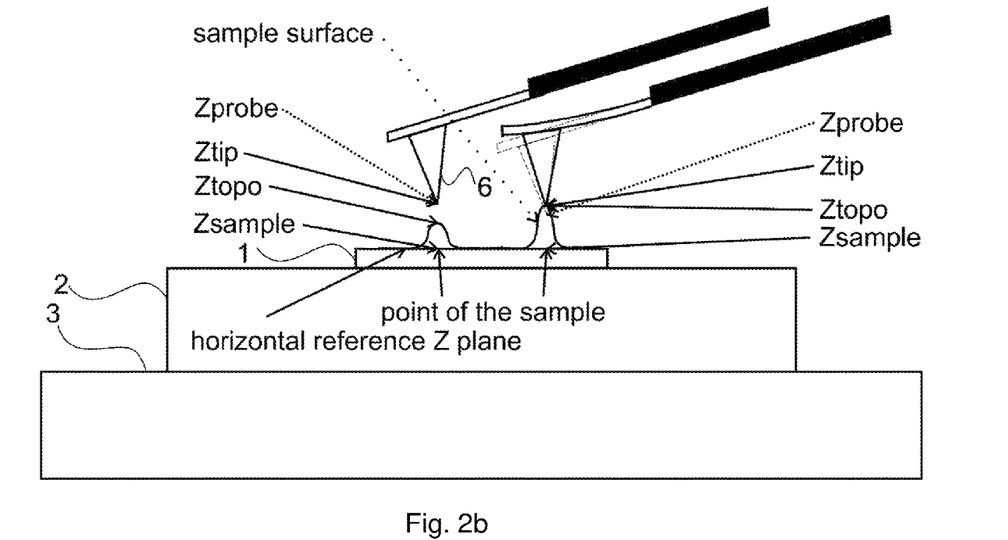
FIG. 2b illustrates the definition of Z coordinates.

Point of the sample is a point in the sample with Z coordinate $z_{sample}$, corresponding to the lowest point in sample topography, i.e. it is a point on the horizontal reference Z plane, as shown in the FIG. 2b. The goal of AFM measurements is to define the coordinate of the sample surface which can be noted $z_{topo}$.

In the most common case, i.e. the probe 4 can move in the vertical direction and the stage 2 can move in the horizontal plane, and with a global coordinate system chosen according to FIG. 2a, the coordinates of a point of the sample can be noted as: $x_{sample}$, $y_{sample}$ for planar coordinates, and $z_{sample}$ for vertical coordinate. In this embodiment, said coordinates $x_{sample}$, $y_{sample}$, $z_{sample}$ of a point of the sample can be defined by the position of the sample stage 2, which is defined by the voltage applied to the stage actuator 3. Coordinate $z_{sample}$ reflects the sample movement in Z direction. The lateral coordinates that reflect sample topography can be noted as $x_{topo}$, $y_{topo}$. Sample morphology is described by the vertical coordinate equal to the sample height above the lowest point on the sample 1, which can be noted as $z_{topo}$. Coordinates $x_{probe}$ and $y_{probe}$ are lateral positions of the probe 4. Coordinate $z_{probe}$ is a vertical position of the probe 4. Coordinates $x_{probe}$, $y_{probe}$ and $z_{probe}$ are defined by the position of the probe actuator 8. Coordinate $x_{tip}$ and $y_{tip}$ are lateral positions of the tip 6. Coordinate $z_{tip}$ is a vertical position of the tip 6. Coordinates $x_{tip}$, $y_{tip}$ and $z_{tip}$ are defined by the position of laser reflection on the photodiode 10. Vertical component of the signal on photodiode 10, $CD=z_{tip}-z_{probe}$. It is possible to define $z_{sample}$, $z_{probe}$ and $z_{tip}$ in any spot inside sample, probe and tip respectively, but for clarity the offsets for $z_{sample}$, $z_{topo}$, $z_{probe}$ and $z_{tip}$ are set up the following way: the vertical position of the lowest point on the sample 1 has $z_{sample}=0$, FIG. 2b. That value is used on all images. In this point $z_{topo}=0$. When the probe 4 is retracted to the distance $\Delta z$, $CD=0$, $x_{tip}=x_{probe}$ and $z_{tip}=z_{probe}$, as illustrated on the left part of the FIG. 2b. When the tip 6 is in the contact with the sample 1 $z_{topo}=z_{tip}-z_{sample}$, as shown on the right part of the FIG. 2b. In this case the position $z_{probe}$ corresponds to the imaginary position of the tip apex in case of unbended cantilever 5. If we note LF the lateral component of the signal on photodiode 10 then $LF=y_{tip}-y_{probe}$. Distance $\Delta z$ is a distance to which the probe 4 is retracted after finishing an approach, usually about 30 nm.

Relative planar coordinates $x_{topo}=x_{tip}-x_{sample}$ and $y_{topo}=y_{tip}-y_{sample}$ define the relative movements of the tip 6 and sample 1. Considering the cantilever 5 bending in case of the tip-to-sample contact and taking into account only measured variables, those equations can be written in the following way: $x_{topo}=x_{tip}-x_{sample}=x_{probe}-x_{sample}$ and $y_{topo}=y_{tip}-y_{sample}=y_{probe}+LF-y_{sample}$. In case of Z axis, the equation is similar:

$$D = z_{tip} - z_{sample} = z_{probe} + CD - y_{sample}.$$

CD data will be used as symbol and/or acronym for cantilever deflection CD as a function of the tip-to-sample distance D. Three dependencies: $z_{tip}(t)$, $z_{probe}(t)$, $z_{sample}(t)$ are usually necessary to measure the resulting dependence $CD=z_{tip}-z_{probe}$ as a function $z_{tip}-z_{sample}$, i.e. as a function of the tip-to-sample distance D.

Negative setpoint $S_{CD}$ is a threshold for attractive interaction between the tip 6 and the sample 1.

Confirmation time $t_s$ is a time during which the AFM defines whether or not the tip 6 and the sample 1 are in interaction by waiting for the tip 6 "ringing notification" before tip 6 retraction. Distance $d_{CP}$ is the reduction of the tip-to-sample distance D during the confirmation part of the confirmation and tip-to-sample distance extending procedure c. Distance $d_{FA}$ is a distance used to determine if the false approach occurs.

Distance $\Delta h$ is the distance between the surface of constant positive cantilever deflection and the surface of constant negative cantilever deflection.

Before examining a sample in an AFM, several basic steps known to those skilled in the art are carried out, in both the state-of-art methods and the method of the present invention. These basic steps include: installation of the probe 4 into the probe holder 7, alignment of the laser 9 and the photodiode 10. Sample 1 attachment to the sample stage 2. Tip 6 approach until cantilever deflection CD is increased from initial value $CD_0$ to the value $CD_1=CD_0+\Delta CD$. $\Delta CD$ is an incremental value set up by operator, usually about 1 nm. After that the probe 4 is retracted by $\Delta z$. $\Delta z$ is set up by operator too, usually 30 nm (for patent application images $\Delta z \sim 2.5$ nm). At this point tip approach is performed, cantilever deflection at this distance is considered to be zero, $CD_2=0$ nm.

Figure 3:
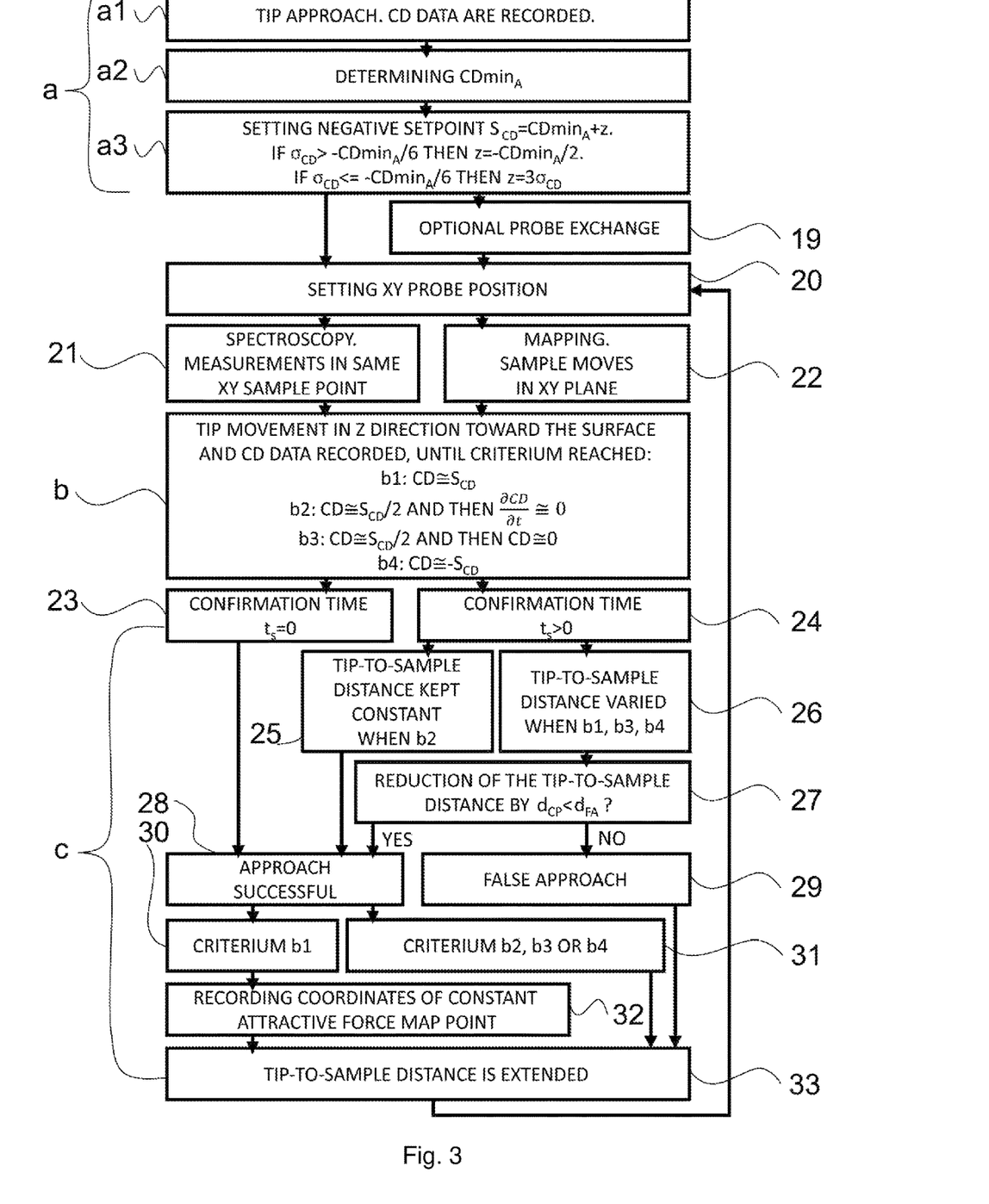
FIG. 3 illustrates the block diagram of the new method according to the present invention for AFM measurements with minimized amount of the tip-to-sample contacts.

The method of examining a sample in an atomic force microscope according to the present invention, in which the amount of the tip-to-sample contacts is very limited, is carried out in an AFM including at least one probe 4, each probe 4 including at least one cantilever 5 and at least one tip 6. One preferred embodiment, using many advantageous features, is shown in FIG. 3. However, it should be noted that many of these features are not necessary to achieve the main technical effect of an aspect of the invention. Nevertheless, this preferred embodiment can be used as a reference to better understand several aspects of the invention that will be described hereinafter.

Generally, the method according to an aspect of the invention is based on the following sequence of procedures:
negative setpoint $S_{CD}$ setting procedure a, wherein the negative setpoint $S_{CD}$ is set as a negative real number;
approaching procedure b comprising: above at least one point of the sample 1, performing an approach comprising reducing the tip-to-sample distance D and recording cantilever deflection CD as a function of the tip-to-sample distance D, while applying the standard sign convention with cantilever deflection CD considered negative for attractive forces and positive for repulsive forces, until at least one of critical criteria is achieved, the critical criteria consisting of or comprising:
first critical criterium b1: the cantilever deflection CD reaches the value substantially equal to the negative setpoint $S_{CD}$, i.e. $CD \cong S_{CD}$;
second critical criterium b2: the cantilever deflection CD reaches the value substantially equal to the negative setpoint $S_{CD}$ divided by two and then the derivative of cantilever deflection in time reaches the value substantially equal to zero, i.e. $CD \cong S_{CD}/2$ is reached and then $$\frac{\partial CD}{\partial t} \cong 0$$

is reached;
third critical criterium b3: the cantilever deflection CD reaches the value substantially equal to the negative setpoint $S_{CD}$ divided by two and then the cantilever deflection CD reaches the value substantially equal to zero, i.e. $CD \cong S_{CD}/2$ is reached and then $CD \cong 0$ is reached;
fourth critical criterium b4: the cantilever deflection CD reaches the value substantially equal to minus negative setpoint $S_{CD}$, i.e. $CD \cong -S_{CD}$,
after what pausing or stopping of the approach is carried out.

By "substantially equal" in equation $CD \cong S_{CD}$ and other similar equations as $CD \cong 0$, $CD \cong -S_{CD}$, $CD \cong S_{CD}/2$, we mean that the deviation of CD from the exact value after $\cong$ in the equation is less than root-mean-square deviation of CD values ($RMS_{CD}$). That means in the case of $CD \cong S_{CD}$ that $CD > S_{CD} - RMS_{CD}$ and $CD < S_{CD} + RMS_{CD}$, where $RMS_{CD}$ is measured when the tip 6 is far from the sample 1.

In one possible embodiment of the present invention, the fourth critical criterium b4 is used as the necessary criterium to stop the tip-to-sample approach after the tip 6 has already touched the surface of the sample 1 and thus to avoid the tip 6 damage. The fourth critical criterium b4 is also used for the definition of Δh (for details see FIG. 6 and the corresponding part of the Description below). In the state-of-art methods the criterium similar to the fourth critical criterium b4 with threshold $CD = \Delta CD$ instead of $CD = -S_{CD}$ is used to stop the tip approach and to determine the surface topography. However, in the method according to the present invention, another criterium to stop the tip 6 approach and thus to save the tip 6 instead of the fourth critical criterium b4 can be used, too. For example, the method of the present invention will work the same way with the fifth critical criterium b5 instead of the fourth critical criterium b4. The fifth critical criterium b5: when the time integral over the approach part 17 of each approach-retraction cycle taken for cantilever deflection becomes greater than 0, the tip 6 approach should stop. However, usage of the fifth criterium b5 will require more computer power to calculate the integral on each approach-retraction cycle, it will complicate the definition of Δh and it will make all obtained data and images much more complicated for understanding.

Figure 4A:
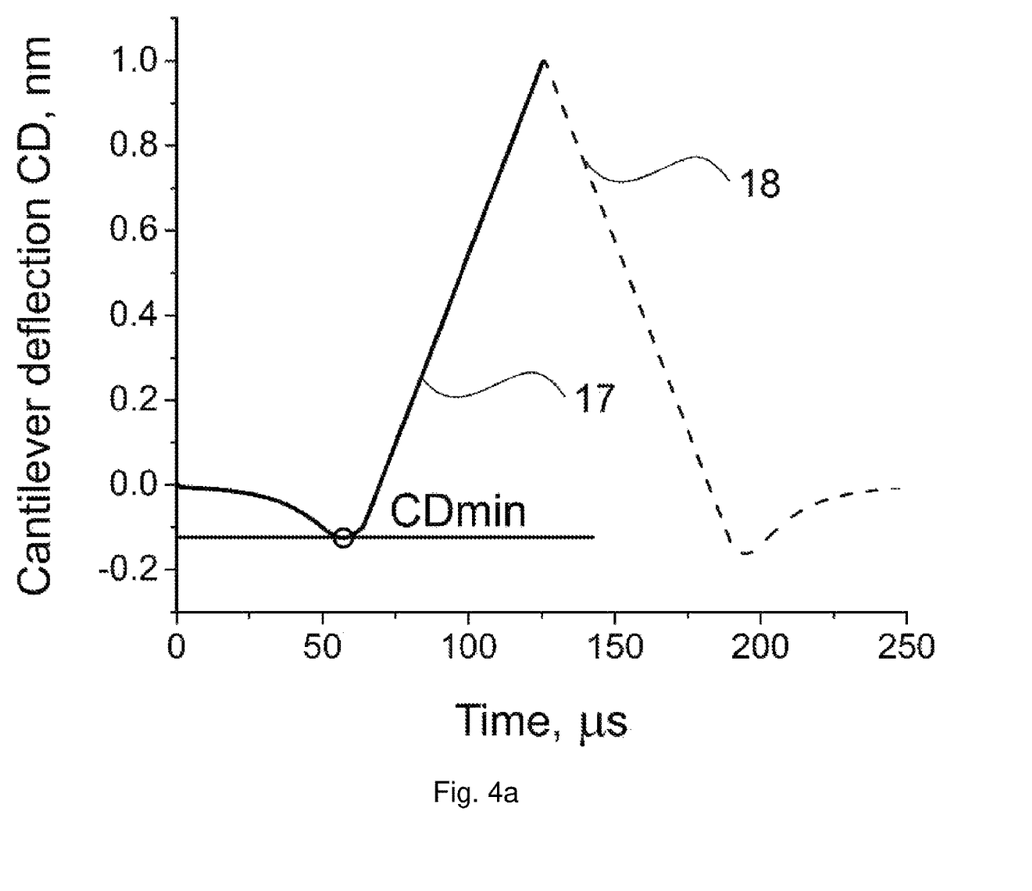
FIG. 4a shows cantilever deflection vs. time, FIG. 4b the cantilever deflection vs. the probe-to-sample distance

Several types of approach-retraction curves can be measured or measured and calculated in AFM. Cantilever deflection vs. time is shown in FIG. 4a, cantilever deflection vs. probe-to-sample distance is in FIG. 4b, and cantilever deflection CD vs. tip-to-sample distance D is in FIG. 4c. All the curves in FIGS. 4a to 4c were obtained during the same approach-retraction cycle above one point of the sample 1.

It is obvious that the retraction of the probe 4 leads to the retraction of the tip 6, and similarly, the approach of the probe 4 leads to the approach of the tip 6.

Figure 4B:
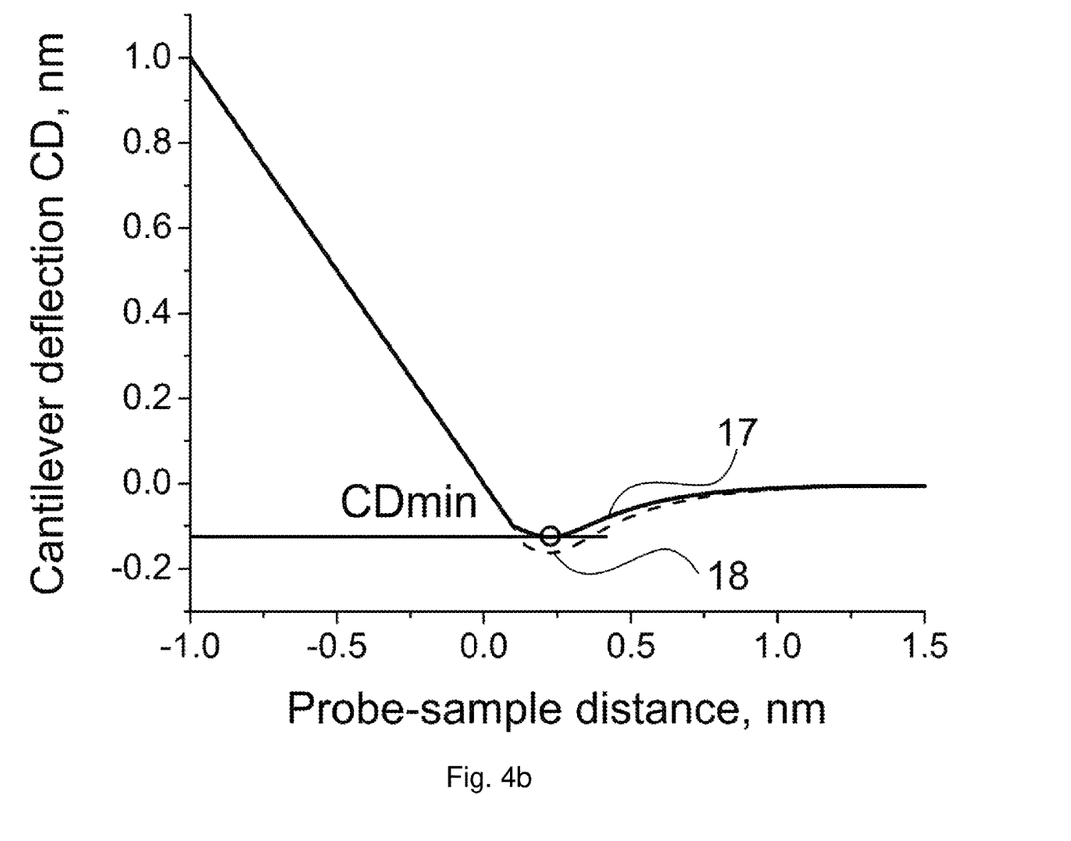
Figure 4C:
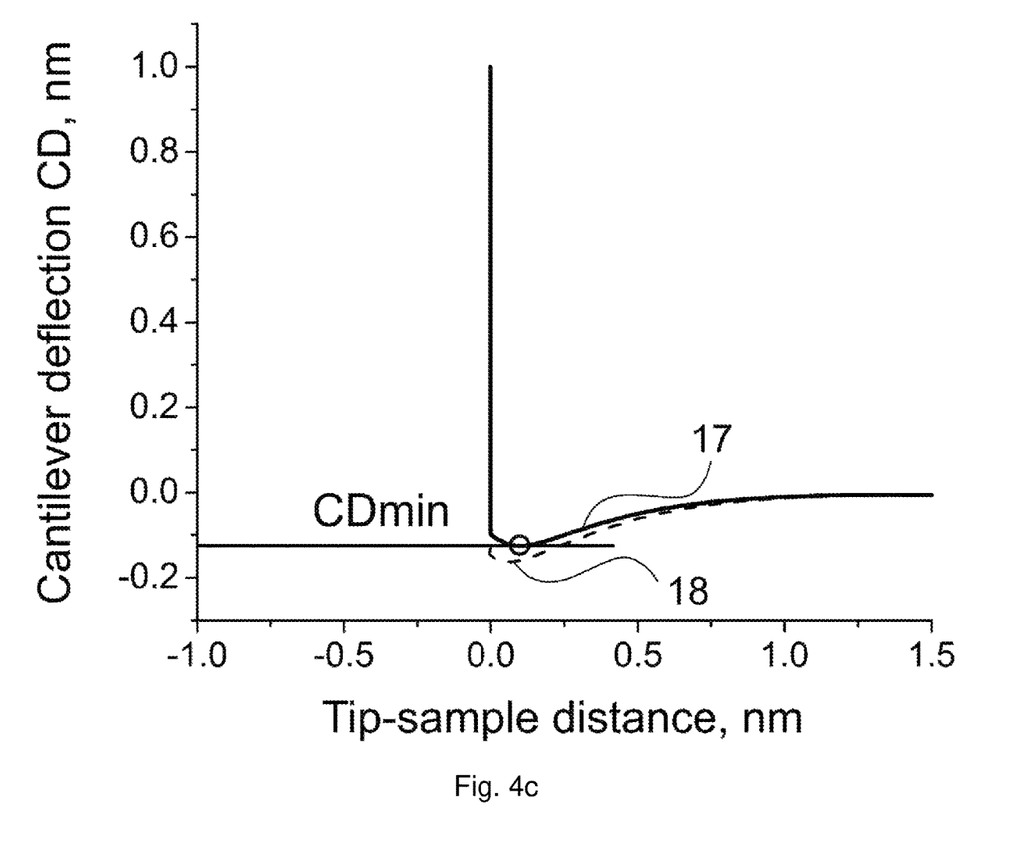
FIG. 4c shows cantilever deflection vs. the tip-to-sample distance D, all the curves illustrate the same approach-retraction cycle.

AFM software sends signals to the probe actuator 8 and to the stage actuator 3 and record corresponding dependencies $z_{probe}(t)$ and $z_{sample}(t)$. AFM software detects the position of laser reflection on photodiode 9 and records the corresponding dependency $z_{tip}(t)$. Based on measured dependencies $z_{tip}(t)$, $z_{probe}(t)$, $z_{sample}(t)$ the dependencies shown in the FIG. 4 are calculated.

It is advantageous to record the dependence of the cantilever deflection on the probe-to-sample distance for both approach 17 (i.e. when the tip/probe-to-sample distance is reduced) and retraction 18 (i.e. when the tip/probe-to-sample distance is extended) parts. The approach is performed from the probe-to-sample distance Δz until ΔCD is reached and retraction to the probe-to-sample distance Δz is performed. Several similar approach-retraction cycles are performed above the same or above several different points of the sample 1 and corresponding cantilever deflection vs. tip-to-sample distance D curves are recorded. Using those force curves the optical sensitivity of cantilever 5 in this AFM system is calculated and the dependence between the probe-to-sample and a tip-to-sample distance D is established: $z_{tip} - z_{sample} = z_{probe} - z_{sample} + CD$. Thus, the curves of cantilever deflection CD recorded as a function of the probe-to-sample distance, see FIG. 4b, can be used to calculate the CD data, i.e. the curves of cantilever deflection CD as a function of the tip-to-sample distance D, see FIG. 4c. Determining the dependency of cantilever deflection CD on the tip-to-sample distance D is usually performed by the above-described method, i.e. using the measuring the dependency of the cantilever deflection CD on the probe-to-sample distance followed by the above-described calculation.

In one preferred embodiment, the negative setpoint $S_{CD}$ setting procedure a comprises the following steps:
first step a1 comprising: placing the tip 6 above at least one point of the sample 1 by moving the sample and/or the tip 6, changing the tip-to-sample distance D and measuring at least one curve of dependency of cantilever deflection CD on the tip-to-sample distance D wherein each curve includes an approach part 17, the approach part 17 being a part of the curve recorded while reducing the tip-to-sample distance D;
second step a2 comprising: for each of the curves measured in the first step a1 finding the value of the cantilever deflection CDmin at absolute minimum of the approach part 17 of the curve, and calculating average value $CDmin_A$ of cantilever deflections CDmin at absolute minimums of the approach parts 17 of the curves across all the curves measured in the first step a1;

third step a3 comprising: determining negative setpoint $S_{CD}$ as said average value $CDmin_A$ of cantilever deflections at absolute minimums of the approach parts 17 of the curves measured in the first step a1, plus z, i.e. $S_{CD}=CDmin_A+z$, wherein z is a real number such that $z\geq 0$ and $z<-CDmin_A$.

One of the curves measured in the first step a1 above one point of the sample is shown in FIG. 4c. The cantilever deflection CDmin at absolute minimum of the approach part 17 of the curve is also shown.

Gauss method for CDmin values with normal distribution usually requires considering 10 different values to obtain statistically significant $CDmin_A$ value in the second step a2. For this reason, it is advantageous to measure more than one curve in the first step a1. The curves can be measured above the same point of the sample 1 or above different points of the sample 1. In a preferred embodiment of the method, the CDmin values are retrieved from the approach part 17 of the curves measured in the first step a1. The retraction part 18 is not suitable for this aim, as it usually involves stretching of adhered objects, rupture of covalent bonds between the tip 6 and the sample 1 and sinusoidal "ringing signal", the effects which should not be considered for determining the negative setpoint $S_{CD}$ in the third step a3.

When in the first step a1, at least two curves of dependency of cantilever deflection CD on the tip-to-sample distance D are measured above at least one point of the sample 1, it is advantageous to calculate standard deviation $\sigma_{CD}$ of cantilever deflections CDmin at absolute minimums of the approach parts 17 of the curves. The standard deviation $\sigma_{CD}$ can be used to determine preferred value of z in the third step a3 and thus to define the negative setpoint $S_{CD}$ in a preferred embodiment. Usually there are two well suited possibilities to determine z: if the distribution of CDmin values is broad, i.e. if $\sigma_{CD}>-CDmin_A/6$ then $z=-CDmin_A/2$ and $S_{CD}=CDmin_A/2$; if the distribution of CDmin values is narrow, i.e. if $\sigma_{CD}\leq-CDmin_A/6$, then $z=3\sigma_{CD}$ and $S_{CD}=CDmin_A+3\sigma_{CD}$. The negative setpoint $S_{CD}$ set in this manner allows to maximize the amount of non-contact approach-retraction cycles and to minimize the amount of false approaches.

If the value of z in the third step a3 is set as $z=3\sigma_{CD}$, ~97% of approach-retraction cycles are stopped by the first critical criterium b1. In this case the tip 6 and the sample 1 are not in contact. Therefore, the tip 6 is not contaminated and sample 1 is not modified during this approach-retraction cycle.

After the tip 6 stops approaching during the approaching procedure b, AFM in a preferred embodiment needs to confirm the close proximity between the tip 6 and the sample 1, to measure and record the tip-to-sample distance D with high precision, e.g. as a part of recording 32 the coordinates of a constant attractive force map point in the embodiment of FIG. 3, and to return to initial or new position. To do this, confirmation time $t_s$ is set, see the time blocks 23, 24 in FIG. 3, the by operator or by microscope software. After having performed the approaching procedure b, confirmation and tip-to-sample distance extending procedure c is performed, said procedure including:

if the confirmation time $t_s=0$ and if during the last execution of the approaching procedure b the first critical criterium b1 was achieved, recording the tip-to-sample distance D and then extending 33 the tip-to-sample distance D;

if the confirmation time $t_s=0$ and if during the last execution of the approaching procedure b other critical criterium than the first critical criterium b1 was achieved, extending 33 the tip-to-sample distance D;

if the confirmation time $t_s>0$ and if during the last execution of the approaching procedure b the second critical criterium b2 was achieved, keeping 25 the tip-to-sample distance D substantially constant during the confirmation time $t_s$, and then extending 33 the tip-to-sample distance D;

if the confirmation time $t_s>0$ and if during the last execution of the approaching procedure (b) other critical criterium than the second critical criterium b2 was achieved, varying 26 the tip-to-sample distance D during the confirmation time $t_s$ in order to hold the cantilever deflection CD equal to the corresponding critical criterium, i.e. $CD \cong S_{CD}$ when the first critical criterium b1 was achieved, $CD \cong 0$ when the third critical criterium b3 was achieved, and $CD \cong -S_{CD}$ when the fourth critical criterium b4 was achieved, and then extending 33 the tip-to-sample distance D.

In this case the tip-to-sample distance D is adjusted to keep the cantilever deflection CD constant. In case of close proximity between the tip 6 and the sample 1, the tip 6 movement will be negligible, and the tip 6 position will be defined with higher precision. In case of large distance between the tip 6 and the sample 1 (i.e. false approach, which may happen for example due to the spike signal in the cantilever deflection), the tip-to-sample distance D will be reduced during the confirmation time $t_s$, and this tip-to-sample distance D value will be ignored, see false approach 29 in FIG. 3.

Extending the tip-to-sample distance D 33 typically means that the probe 4 is retracted by a distance which is noted $\Delta z$. $\Delta z$ is set up by operator and usually is 30 nm. It is possible to use different $\Delta z$ values during the approach in the first step a1 and during the measurements.

Figure 5:
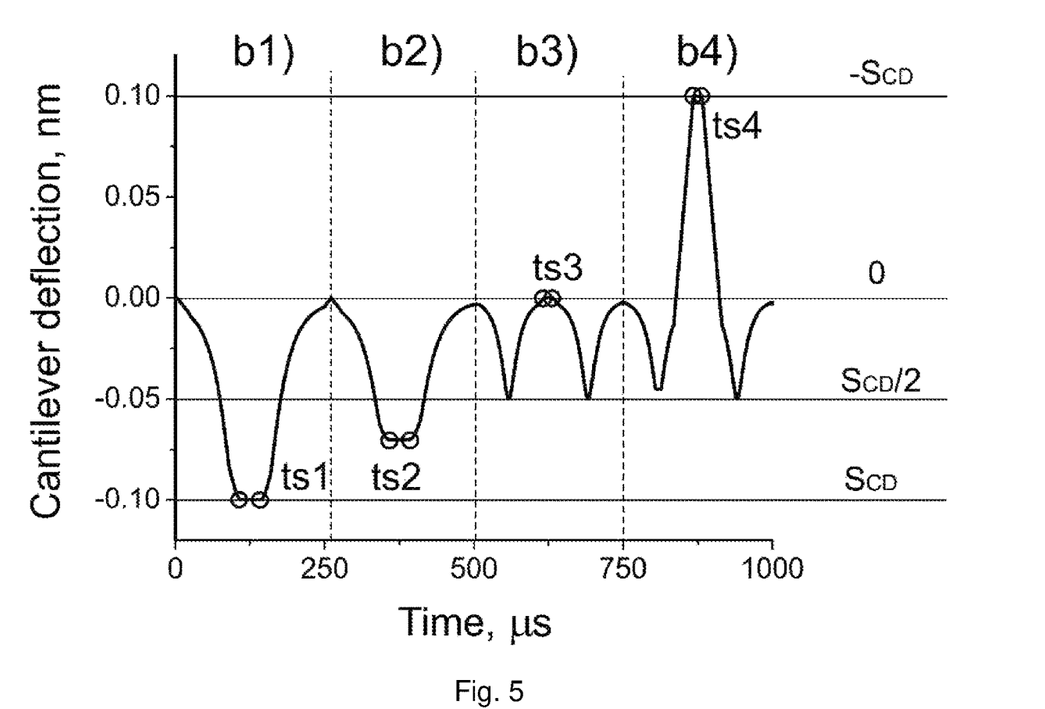
FIG. 5 illustrates four critical criteria of the approaching procedure based on the negative setpoint $S_{CD}$ which are used to stop the tip approach toward the surface of the sample.

In FIG. 5, cantilever deflection vs time dependence for four approach-retraction cycles in four different points of the sample 1 is shown, from left to right, the cycles are stopped by critical criteria b1, b2, b3 and b4 respectively. The use of confirmation time $t_s$ is shown as well, the confirmation times for different critical criteria being distinguished by ordinal numbers corresponding to the ordinal numbers distinguishing the critical criteria.

Based on the four critical criteria b1, b2, b3, b4 used in this method, all four approach-retraction cycles shown in the FIG. 5 have weaker tip-to-sample interaction compared to the approach-retraction cycle shown in the FIGS. 4, as $\Delta CD$ is usually much larger, than $-S_{CD}$.

In the preferred embodiment, as shown e.g. in FIG. 5 or in FIG. 3, the sequence of the approaching procedure b and of the confirmation and tip-to-sample distance extending procedure c can be performed repeatedly. That means that, the approaching procedure of step b is stopped by one of the critical criteria and followed by the confirmation and tip-to-sample distance extending procedure c including keeping constant or varying the tip-to-sample distance D during the confirmation time $t_s$, after what the tip-to-sample distance D is extended. This can repeat the number of times set by operator or by the AFM software. This sequence of procedures b and c can be repeated above one point of the sample 1, see point spectroscopy measurements 21 in FIG. 3, or above a multitude of points of the sample 1, see mapping 22 in FIG. 3.

The measurements performed with confirmation time $t_s=0$ are faster than the measurements performed with confirmation time $t_s>0$. However, the topography map is defined with less precision when measurements are carried out with $t_s=0$.

In previous paragraphs only the vertical movement of the tip 6 above the sample surface 1 was described. However, the method can be used not only for force spectroscopy measurements 21 in one point of the sample 1, but also for scanning the sample 1 in lateral directions, which is useful for mapping 22. Lateral scanning movement can be realized by the planar movement of the sample stage 2, to which the sample 1 is attached and/or by the planar movement of the probe 4.

The sample stage 2 has usually a planar top surface. In this case, the relative scanning movement of the probe 4 and the sample 1 surface is realized by moving the probe 4 in a plane substantially parallel to the sample stage 2 top surface and/or by moving the sample 1 in a plane substantially parallel to the sample stage 2 top surface.

The coordinates of this relative scanning movement can be recorded continuously and/or in particularly chosen moments while repeating the procedures b and c of the method according to the present invention. The approach-retraction movements of one cycle of procedures b and c can occur above multiple points of the sample 1 during the scanning. It is also possible to carry out one cycle approach-retraction with including procedures b and c above one point of the sample 1 and then move by lateral scanning to another point of the sample 1.

In one embodiment, while repeating the sequence of procedures b, c, a quasiperiodic alternation of reducing and extending tip-to-sample distance D is set with frequency f.

In order to avoid unwanted cantilever 5 oscillation and reduce "ringing signal" the measurements should be performed at a frequency f satisfying conditions $f=(0.001-0.9)\times f_{res}$ or $f>1.1\times f_{res}$, wherein $f_{res}$, is the resonance frequency of the cantilever 5.

Therefore, the method is called non-contact non-resonant AFM method. For cantilevers with low Q factor or for measurements in liquids the measurements can be performed at the cantilever resonance frequency, too.

In order to obtain sufficient amount of datapoints in each cantilever deflection—tip-to-sample distance curve (at least 1000 points), the measurements should be performed on the frequency below 10 kHz. In order to obtain the image with sufficient resolution in reasonable amount of time, the measurements should be performed at the frequency above 0.1 kHz. Initial frequency 1 kHz is reasonable. In other words, the time interval for the one approach-retraction cycle including steps b and c is 0.1-10 s (frequency 10-0.1 kHz).

Figure 6:
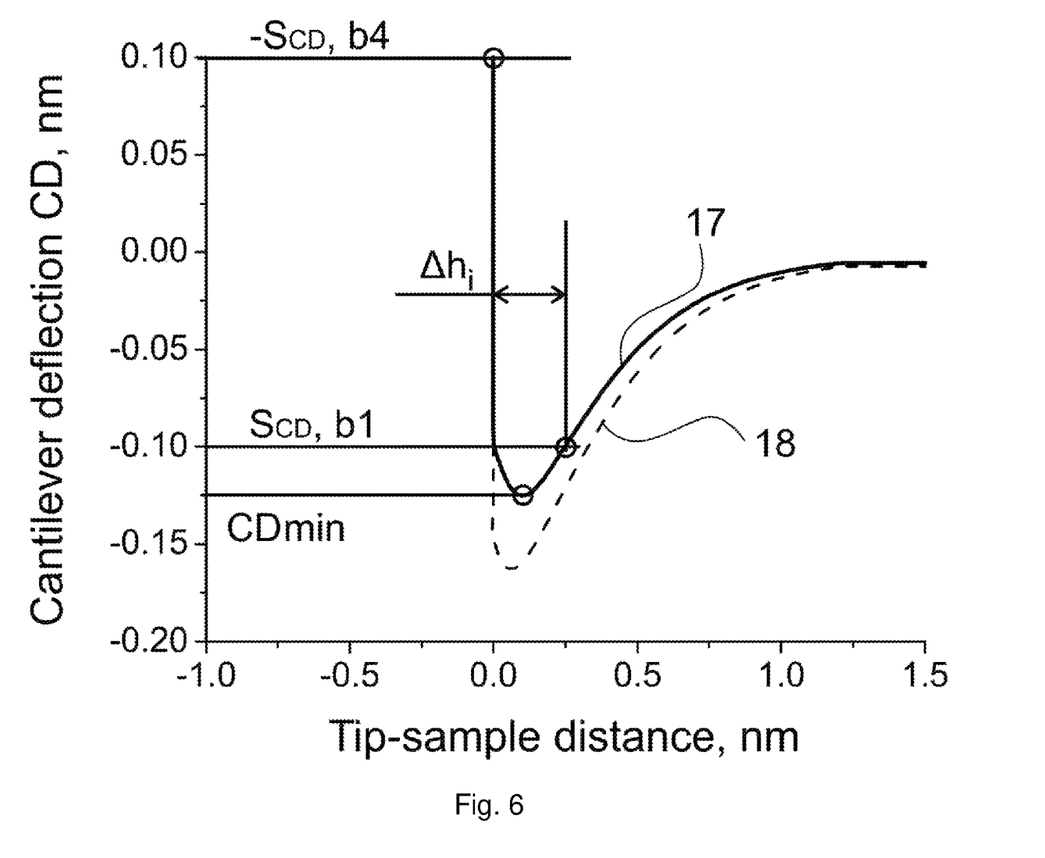
FIG. 6 shows the cantilever deflection for two similar approach-retraction cycles, the first stopped after CD reaches $S_{CD}$ value and the second stopped after CD reaches −$S_{CD}$ value.

The distances $\Delta h_i$ are the vertical distances between the tip 6 positions for the nearest places on the sample 1, obtained in case i) when the tip 6 approach was stopped by criterium b1 and ii) the tip 6 approach was stopped by criterium b4 as shown in the FIG. 6.

The graph in FIG. 6 is plotted in coordinates CD vs. $z_{tip}-z_{sample}$ for the point of sample with lowest Z coordinate in order to show, that the tip 6 and the sample 1 are not in contact when cantilever deflection reaches $S_{CD}$ value, and to precisely define distance $\Delta h_i$. This graph can be reconstructed only after the measurements, because the values on its x axis require information about the values on its y axis.

A first topography map, which can be denoted as a constant attractive force map, can be obtained by the present invention. This constant attractive force map contains topographical information about the sample 1 and is created for a plurality of points of the sample 1 for which the first critical criterium b1 was achieved. In the best mode of operation, all points for which the first critical criterium b was achieved are included.

More precisely, creating the constant attractive force map includes recording 32 coordinates of constant attractive force map points in 3D space, the coordinates of each constant attractive force map point comprising:

two relative planar coordinates describing the position of the point of the sample 1 for which the first critical criterium b1 was achieved, with respect to the position of the tip 6, in a plane substantially parallel to the top surface of the sample stage 2. These relative planar coordinates can be expressed in a preferred embodiment as $x_{topo}=x_{tip}-x_{sample}=x_{probe}-x_{sample}$ and $y_{topo}=y_{tip}-y_{sample}=y_{probe}+LF-y_{sample}$, and one space coordinate corresponding to the tip-to-sample distance D for which the criterium b1 was achieved for that point of the sample 1, wherein in a preferred embodiment $D=z_{probe}+CD-z_{sample}$ which is equal to sample height $z_{topo}+\Delta h_i$.

In the most common AFM configuration with the probe 4 moving in the vertical direction only and with the stage 2 moving in the horizontal plane, the planar coordinates $x_{sample}$, $y_{sample}$ of the point of the sample can be chosen as defined by the position of the sample stage 2 in a global coordinate system as the one shown in FIG. 2a. The reason is that in this case, the position of the sample stage 2 defines the point which finds itself below the tip 6, which is being mapped. In the case of a more general relative movement of the probe 4 and of the stage 2, it is necessary to measure the data necessary to obtain the planar coordinates of the point of the sample which is below the tip 6, in a coordinate system related to the sample stage 2.

In order to make the constant attractive force map more complete, in case the approach was stopped or paused in the approaching procedure b by other critical criterium than the first critical criterium b1, after completing the confirmation and tip-to-sample distance extending procedure c, the scanning is paused and the approaching procedure b is repeated again above the same point of the sample 1. While if the approach during this second repetition of the approaching procedure b is stopped by the first critical criterium b1, a constant attractive force map point is created by recording its coordinates, and then the confirmation and tip-to-sample distance extending procedure c is performed and the scanning resumes. This procedure should be repeated only once, as without this remark the measurements will be done only in this point. Second tip approach in the same XY point can be avoided if it cannot be realized, i.e. if sufficiently fast stopping of sample movement or sufficiently slow sample movement are not possible.

Second type of topography map, which can be denoted as the constant repulsive force map. Creating the constant repulsive force map includes recording coordinates of constant repulsive force map points in 3D space, the coordinates of each constant attractive force map point comprising:

two relative planar coordinates corresponding to relative planar coordinates of the point of the sample 1 for which the fourth critical criterium b4 was achieved, the relative planar coordinates being measured in a plane substantially parallel to the top surface of the sample stage 2 and with respect to the position of the tip 6, wherein in a preferred embodiment, the two relative planar coordinates can be expressed as: $x_{topo}=x_{probe}-x_{sample}$ and $y_{topo}=y_{probe}+LF-y_{sample}$, and one space coordinate corresponding to the tip-to-sample distance D for which the criterium b4 was achieved for that point of the sample 1. In a preferred embodiment, this space coordinate can be expressed as $D=z_{probe}+CD-z_{sample}$ which is equal to sample height $z_{topo}$.

Averaged distance $\Delta h$ is the distance between the surface of constant positive cantilever deflection and the surface of constant negative cantilever deflection, in other words, $\Delta h$ shows the height difference between the topography map of constant attractive force and the topography map of constant repulsive force.

If in the case of the confirmation time $t_s>0$ a reduction of the tip-to-sample distance D occurs during the confirmation part of the confirmation and tip-to-sample distance extending procedure c, this reduction of the tip-to-sample distance D will be noted as $d_{CP}$. $d_{CP}$ is assumed to be zero if the tip-to-sample distance D during the confirmation part of the confirmation and tip-to-sample distance extending procedure c was increased. $d_{CP}=0$ in case of $t_s=0$. For confirmation time $t_s>0$ parameter $d_{FA}$ can be defined by operator or by microscope software. Usual value is $d_{FA}=0.1$ nm.

In the case of the confirmation time $t_s>0$, if for a point of the sample 1 the reduction of the tip-to-sample distance $d_{CP}>d_{FA}$ during the confirmation part of the confirmation and tip-to-sample distance extending procedure c, the false approach 29 occurs. In this case the approach-retraction cycle should be repeated once again. In other words, for a point of the sample 1 where the tip-to-sample distance D was reduced during the confirmation time $t_s$ by more than $d_{FA}$, after completing the confirmation and tip-to-sample distance extending procedure c, the scanning is paused and the sequence of the approaching procedure b and of the confirmation and tip-to-sample distance extending procedure c is repeated once again above the same point of the sample 1, and then the scanning resumes. If the second tip approach was stopped by criterium b1 and approach was successful, i.e. $d_{CP}<d_{FA}$, the coordinates of the attractive force map point are recorded or updated. Otherwise the coordinates of the attractive force map point are not saved or removed from the attractive force map. Second tip approach in the same XY point can be avoided if it cannot be realized, i.e. if sufficiently fast stopping of sample movement or sufficiently slow sample movement are not possible.

Still in the case of the confirmation time $t_s>0$, if for a point of the sample 1 where the tip-to-sample distance D was reduced during the confirmation time $t_s$ by less than $d_{FA}$, i.e. when $d_{CP}<d_{FA}$, and the first criterium b1 was achieved in the approaching procedure b, the coordinates of the attractive force map point are recorded or updated. There are two main possible implementations how to proceed with the coordinates of the attractive force map point: a) the coordinates of the attractive force map point recorded after the approach was stopped by the first criterium b1 independently on $t_s$ value, updated after confirmation that $d_{CP}<d_{FA}$ or removed in case of $d_{CP} \geq d_{FA}$; b) the coordinates of the attractive force map point in case of $t_s=0$ are recorded after the approach was stopped by the first criterium b1 and in case of $t_s>0$ the values are recorded only after confirmation that $d_{CP}<d_{FA}$, as presented in preferred embodiment shown in FIG. 3 in steps 24-32.

The method according to an aspect of the invention is superior to other methods due to smaller amount of the tip-to-sample interactions. It is possible to reduce this amount even more by performing measurements using two similar AFM probes 4 from the same box or using reversed tip sample method with multiple tips, which is disclosed in U. Celano et al., "Reverse tip sample scanning for precise and high-throughput electrical characterization of advanced nodes," 2019 IEEE International Electron Devices Meeting (IEDM), San Francisco, CA, USA, 2019, pp. 5.1.1-5.1.4, doi: 10.1109/IEDM19573.2019.8993661. In this case the first probe 4 is used to calibrate the tip-to-sample interaction, it will record whole topography image with large amount of contact points. Using the first probe 4 more reliable value of negative setpoint $S_{CD}$ and the constant repulsive force map will be obtained. After measurement of corresponding cantilever deflection CD vs. tip-to-sample distance D curves, i.e. after the first step a1 of the negative setpoint $S_{CD}$ setting procedure a, see the curves in FIGS. 4a, 4b, 4c, and before the first execution of the approaching procedure b, the first probe 4 can be exchanged 19 for the second probe 4 of same type. The previously defined negative setpoint $S_{CD}$ value according to the third step a3, should be used without repeating the preliminary calibration with the second probe 4, i.e. without carrying the first step a1 with the second probe 4, to preserve second tip 6. The second tip 6 in non-contact non-resonant AFM mode should touch the sample 1 quite rarely (<2.5% of approach-retraction cycles), thus the second tip 6 contamination and the sample 1 modification are negligible.

FIG. 3 shows the complex preferred embodiment of the method using many advantageous steps according to the preceding paragraphs. It should be noted that many of these features are not necessary to achieve the main technical effect of an aspect of the invention. Nevertheless, this preferred embodiment can be used as the reference to better understand several aspects of the invention. First, it describes the negative setpoint $S_{CD}$ setting procedure a with its possible steps a1, a2, a3. Then it shows the optional probe exchange 19, setting 20 the XY probe position and two possible implementations of the method, force spectroscopy measurements 21, when the stage does not move, and mapping 22, when the stage moves in the XY direction. The main novelty of this invention is the approaching procedure b, i.e. the usage of four critical criteria to stop the tip 6 approach toward the sample 1 before the contact between the tip 6 and sample 1. Next is the confirmation and tip-to-sample distance extending procedure c. It includes setting the confirmation time $t_s$, $t_s=0$ is in the first time block 23 and $t_s>0$ is in second time block 24. In case of $t_s=0$ the tip-to-sample distance D is not varied, $d_{CP}=0$ and successful approach 28 occurs by default. In case of $t_s>0$ the tip-to-sample distance D is varied 26 if at least one of the critical criteria b1, b3, b4 is achieved. In case of $d_{CP}<d_{FA}$ in the distance reduction decision block 27, successful approach 28 of the tip 6 and of the sample 1 occurs in this sample point. If the successful approach 28 was stopped 30 by the first critical criterium b1, then recording 32 of the coordinates of the attractive force map point is carried out, which means that the tip-to-sample distance D and the data about the relative planar coordinates of the tip 6 and of the sample 1 are recorded in output channel, and extension 33 of the tip-to-sample distance D may succeed. If the successful approach 28 was stopped 31 by at least one of the critical criteria b2, b3, b4, extension 33 of the tip-to-sample distance D may succeed directly. In case of $d_{CP}>d_{FA}$ in the distance reduction decision block 27, the tip approach in this sample point is not successful, i.e. false approach 29 occurs and extension 33 of the tip-to-sample distance D succeeds. While extending 33 the tip-to-sample distance D or after that, the probe 4 is also returned into its initial or new XY position 20.

Figure 7:
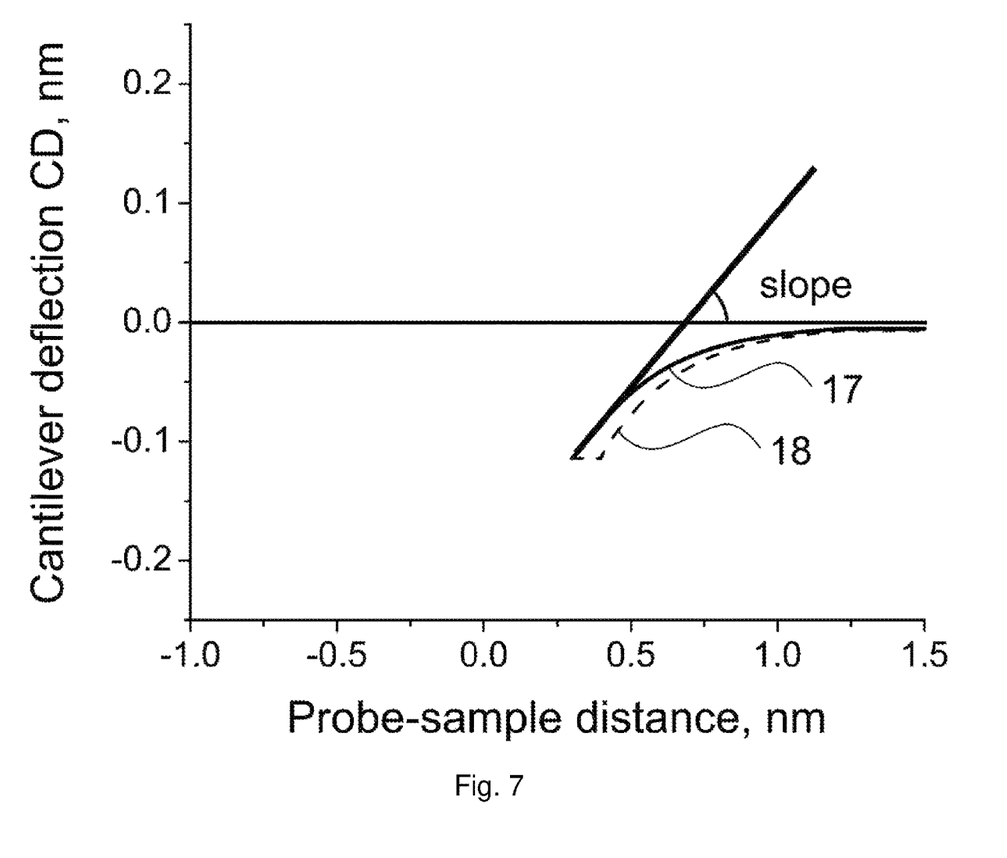
FIG. 7 illustrates that the slope of cantilever deflection curve vs. time, i.e. (dCD/dt), can be used as another criterium to stop the tip-to-sample approach in the attractive forces range.

If the cantilever deflection CD vs. time curve is not too noisy and standard sinusoidal signal is not too large, it is possible to use the slope of cantilever deflection vs. time curve, i.e. the first time derivative of the cantilever deflection (dCD/dt) as the main variable instead of the cantilever deflection CD. In this case the tip 6 approach should stop after i) the slope has reached some value (defined during calibration, as shown in the FIG. 7) or after ii) second time derivative ($d^2CD/dt^2$) changes its sign.

In general case instead of recording 32 only the coordinates of constant attractive force map points, i.e. instead of saving only the topography map data, it is possible to record all time dependencies, i.e. dependencies $x_{sample}(t)$, $y_{sample}(t)$, $z_{sample}(t)$, $x_{tip}(t)$, $y_{tip}(t)$, $z_{tip}(t)$, $x_{probe}(t)$, $y_{probe}(t)$, $z_{probe}(t)$. By time dependency recording we also mean recording of constant values in case of fixed variables. These data can be used for further advanced analysis of tip-to-sample interaction.

It is possible, that most of the approaches in the approaching procedure b will not be stopped by the first criterium b1. In this case the constant attractive force map will not have enough data to represent sample morphology. In such situation the third type of topography map, which combines data from all approaches stopped by all criteria b1-b4, can be created.

The method of examining a sample 1 in an atomic force microscope according to the present invention, which is non-contact and preferably non-resonant, can be realized on all commercially available AFMs without the need to modify hardware. In principle, only software modification is sufficient for implementation of this method.

The invention claimed is:

1. A method of examining a sample in an atomic force microscope including at least one probe, each probe including at least one cantilever and at least one tip, comprising carrying out the following sequence of procedures:
    a negative setpoint $S_{CD}$ setting procedure (a), wherein the negative setpoint $S_{CD}$ is set as a negative real number;
    an approaching procedure (b) comprising: above at least one point of the sample, performing an approach comprising reducing the tip-to-sample distance D and recording cantilever deflection CD as a function of the tip-to-sample distance D, while applying the standard sign convention with cantilever deflection CD considered negative for attractive forces and positive for repulsive forces, until at least one of critical criteria is achieved, the critical criteria consisting of or comprising:
        a first critical criterium (b1): the cantilever deflection CD reaches the value substantially equal to the negative setpoint $S_{CD}$, i.e. $CD \cong S_{CD}$;
        a second critical criterium (b2): the cantilever deflection CD reaches the value substantially equal to the negative setpoint $S_{CD}$ divided by two and then the derivative of cantilever deflection in time reaches the value substantially equal to zero, i.e. $CD \cong S_{CD}/2$ is reached and then $$\frac{\partial CD}{\partial t} \cong 0$$

is reached;
        a third critical criterium (b3): the cantilever deflection CD reaches the value substantially equal to the negative setpoint $S_{CD}$ divided by two and then the cantilever deflection CD reaches the value substantially equal to zero, i.e. $CD \cong S_{CD}/2$ is reached and then $CD \cong 0$ is reached;
        a fourth critical criterium (b4): the cantilever deflection CD reaches the value substantially equal to minus negative setpoint $S_{CD}$, i.e. $CD \cong -S_{CD}$, and pausing or stopping of the approach after performing the approaching procedure.

2. A method of claim 1, wherein negative setpoint $S_{CD}$ setting procedure (a) comprises the following steps:
    a first step (a1) comprising: placing the tip above at least one point of the sample by moving the sample and/or the tip, changing the tip-to-sample distance D and measuring at least one curve of dependency of cantilever deflection CD on the tip-to-sample distance D wherein each curve includes an approach part, the approach part being a part of the curve recorded while reducing the tip-to-sample distance D;
    a second step (a2) comprising: for each of the curves measured in the first step (a1) finding the value of the cantilever deflection CDmin at absolute minimum of the approach part of the curve, and calculating average value $CDmin_A$ of cantilever deflections CDmin at absolute minimums of the approach parts of the curves across all the curves measured in the first step (a1);
    a third step (a3) comprising: determining negative setpoint $S_{CD}$ as said average value $CDmin_A$ of cantilever deflections at absolute minimums of the approach parts of the curves measured in the first step (a1), plus z, i.e. $S_{CD}=CDmin_A+z$, wherein z is a real number such that $z \geq 0$ and $z < -CDmin_A$.

3. The method of claim 1, comprising setting confirmation time $t_s$ by operator or by microscope software and further comprising confirmation and tip-to-sample distance D extending procedure (c) including:
    if the confirmation time $t_s=0$ and if during the last execution of the approaching procedure (b) the first critical criterium (b1) was achieved, recording the tip-to-sample distance D and then extending the tip-to-sample distance D;
    if the confirmation time $t_s=0$ and if during the last execution of the approaching procedure (b) other critical criterium than the first critical criterium (b1) was achieved, extending the tip-to-sample distance D;
    if the confirmation time $t_s>0$ and if during the last execution of the approaching procedure (b) the second critical criterium (b2) was achieved, keeping the tip-to-sample distance D substantially constant during the confirmation time $t_s$, and then extending the tip-to-sample distance D;
    if the confirmation time $t_s>0$ and if during the last execution of the approaching procedure (b) other critical criterium than the second critical criterium (b2) was achieved, varying the tip-to-sample distance D during the confirmation time $t_s$ in order to hold the cantilever deflection CD equal to the corresponding critical criterium, i.e. $CD \cong S_{CD}$ when the first critical criterium (b1) was achieved, $CD \cong 0$ when the third critical criterium (b3) was achieved, and $CD \cong -S_{CD}$ when the fourth critical criterium (b4) was achieved, and then extending the tip-to sample distance D.

4. The method of claim 2, wherein in the first step (a1) at least two curves of dependency of cantilever deflection CD on the tip-to-sample distance D are measured above at least one point of the sample and standard deviation $\sigma_{CD}$ of cantilever deflections CDmin at absolute minimums of the approach parts of the curves is calculated.

5. The method of claim 4, wherein if $\sigma_{CD} > -CDmin_A/6$ then z in the third step (a3) is determined as $z=-CDmin_A/2$.

6. The method of claim 4, wherein if $\sigma_{CD} \leq -CDmin_A/6$ then z in the third step (a3) is determined as $z=3\sigma_{CD}$.

7. The method of claim 3, wherein the sequence of the approaching procedure (b) and of the confirmation and tip-to-sample distance extending procedure (c) is performed repeatedly.

8. The method of claim 7, wherein the sample is attached to a sample stage with a planar top surface the method including relative scanning movement of the probe and of the sample surface, wherein said relative scanning movement is realized by moving the probe in a plane substantially parallel to the sample stage top surface and/or by moving the sample stage in a plane substantially parallel to the sample stage top surface.

9. The method of claim 7, wherein while repeating the approaching procedure (b) and the confirmation and tip-to-sample distance extending procedure (c), a quasiperiodic alternation of reducing and extending tip-to-sample distance D is set with frequency f satisfying conditions $f=(0.001-0.9) \times f_{res}$ or $f>1.1 \times f_{res}$, wherein $f_{res}$ is the resonance frequency of the cantilever.

10. The method according to claim 9, wherein the frequency f falls in the range of 0.1 kHz to 10 kHz.

11. The method of claim 8, including creating a constant attractive force map containing the topographical information about the sample for a plurality of points of the sample for which the first critical criterium (b1) is achieved, wherein creating the constant attractive force map includes recording (32) coordinates of constant attractive force map points in 3D space, the coordinates of each constant attractive force map point comprising:
    two relative planar coordinates describing the position of the point of the sample, for which the first critical criterium (b1) was achieved, with respect to the position of the tip, in a plane substantially parallel to the top surface of the sample stage, and
    one space coordinate, wherein the space coordinate corresponds to the tip-to-sample distance D for which the first critical criterium (b1) was achieved for that point of the sample.

12. The method of claim 11, wherein for a point of the sample where the approach was stopped or paused in the approaching procedure (b) by other critical criterium than the first critical criterium (b1), after completing the confirmation and tip-to-sample distance extending procedure (c), the scanning is paused and the approaching procedure (b) is repeated once again above the same point of the sample, while if the approach during this second repetition of approaching procedure (b) is stopped by the first critical criterium (b1), coordinates of a constant attractive force map point are recorded, and then the confirmation and tip-to-sample distance extending procedure (c) is carried out and the scanning resumes.

13. The method of claim 8, wherein for confirmation time $t_s>0$ parameter $d_{FA}$ is defined by operator or by microscope software and wherein for a point of the sample where the tip-to-sample distance D was reduced during the confirmation time $t_s$ by more than $d_{FA}$, after completing the confirmation and tip-to-sample distance extending procedure (c), the scanning is paused and the sequence of the approaching procedure (b) and of the confirmation and tip-to-sample distance extending procedure (c) is repeated once again above the same point of the sample, and then the scanning resumes.

14. The method of claim 11, wherein for confirmation time $t_s>0$ parameter $d_{FA}$ is defined by operator or by microscope software and wherein for a point of the sample where the tip-to-sample distance D was reduced during the confirmation time $t_s$ by less than $d_{FA}$, and the first criterium (b1) was achieved in the approaching procedure (b), the coordinates of the attractive force map point are updated.

15. The method of claim 2, wherein the probe exchange is performed after the first step (a1) of the negative setpoint $S_{CD}$ setting procedure (a) and before the first execution of the approaching procedure (b).

* * * * *